April 20, 1926. 1,581,440
H. H. HAMMERSTROM
WATER GAUGE FOR RADIATORS FOR MOTOR VEHICLES
Filed Dec. 22, 1921
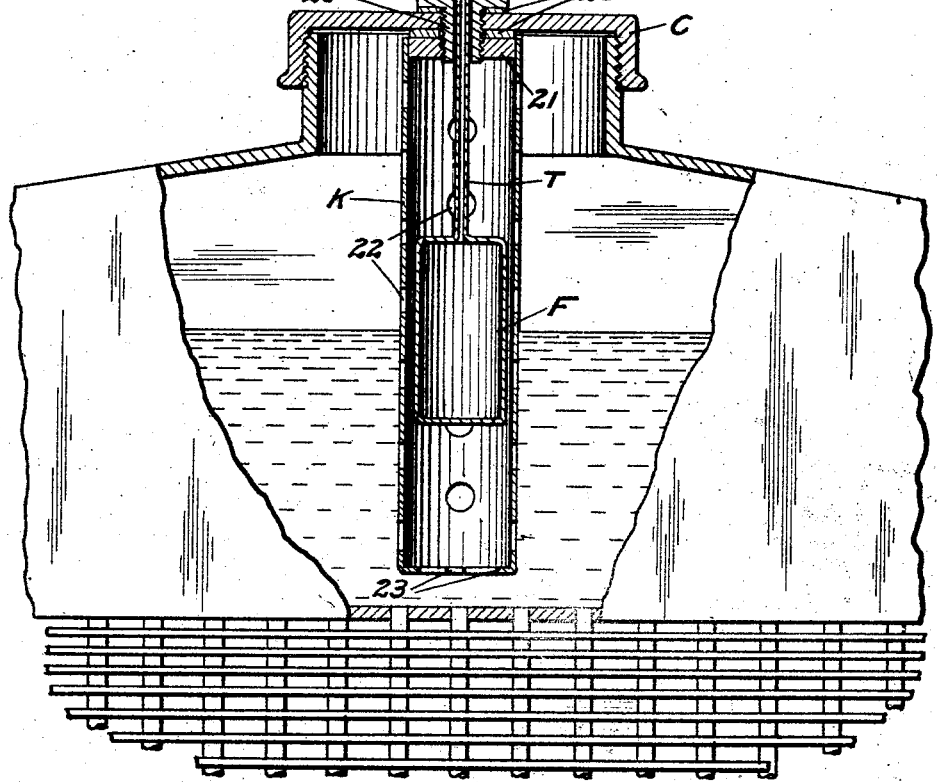
INVENTOR
H. H. HAMMERSTROM
BY Hazard & Miller
ATT'YS.

Patented Apr. 20, 1926.

1,581,440

UNITED STATES PATENT OFFICE.

HENRY H. HAMMERSTROM, OF MONROVIA, CALIFORNIA, ASSIGNOR, BY DIRECT AND MESNE ASSIGNMENTS, TO H. & H. WATAMETER CO., OF LOS ANGELES, CALIFORNIA, A CORPORATION OF CALIFORNIA.

WATER GAUGE FOR RADIATORS FOR MOTOR VEHICLES.

Application filed December 22, 1921. Serial No. 524,143.

*To all whom it may concern:*

Be it known that I, HENRY H. HAMMERSTROM, a citizen of the United States, residing at Monrovia, in the county of Los Angeles and State of California, have invented new and useful Improvements in Water Gauges for Radiators for Motor Vehicles, of which the following is a specification.

My invention relates to water gauges for the radiators of motor vehicles, and a purpose of my invention is the provision of an indicator of this character adapted for application to a radiator cap and which operates to give a visible indication of the water content of the radiator so that the driver of an automobile while in driving position can readily determine the amount of water in the radiator.

I will describe one form of water gauge embodying my invention and will then point out the novel features thereof in claims.

In the accompanying drawings,

Figure 1 is a view showing in side elevation and partly in section, a radiator having applied thereto one form of water gauge embodying my invention.

Fig. 2 is a transverse sectional view taken on the line 2—2 of Fig. 1.

Referring specifically to the drawings in which similar reference characters refer to similar parts, my invention, in its present embodiment, comprises a body designated generally at B, which in the present instance is of rectangular form with the marginal edge thereof provided with a bead 15 which is rectangular in cross section as clearly shown in Fig. 2. The inner portion of the body consists of a flat partition 16 which is vertically slotted at a point indicated at 15ª to communicate with an upper duct 17 and a lower duct 18.

As clearly shown in Fig. 2, the lower end of the body B is provided with a circular head 19 from which is extended an exteriorly threaded pipe section 20 formed integral with the head and adapted to be engaged by a head 21. The head 21 in turn sustains a tubular casing K which is perforated as indicated at 22, while its lower end is open and provided with inwardly extending lips 23 for the purpose of confining a float F therein.

As clearly shown in Fig. 1, the float F is hollow and preferably formed of metal and of such a size as to be freely movable vertically within the casing K. The upper end of the float F is fixed to and in communication with a tubular stem T, this stem also being formed of metal and of such a length as to extend through the pipe section 20, the duct 18 and into the slot 15ª.

As shown, a transparent tube 24 is secured within the slot 15ª by means of a screw plug 25 threadedly fitted within the duct 17 and provided with a knurled head 26. A cork plug 27 closes the upper end of the tube 24, while the lower end of the latter is open and in communication with the duct 18 to allow of the escape of vapor from the tube.

In the applied position of the water gauge to a radiator, the pipe section 20 is extended through a suitable opening formed axially within a radiator cap C, so that by applying the head 21 together with the casing K, the heads 19 and 21 will co-operate in effectively clamping the gauge to the cap. Washers 28 are interposed between the cap and the heads 19 and 21 to prevent the escape of fluid from the cap, as will be understood. With the gauge so associated with the cap C, the body B together with the transparent tube 24 will be positioned in overlying relation with respect to the cap and exteriorly of the radiator when the cap is in applied position upon the radiator spout, as is clearly shown in Fig. 1. The casing K depends from the lower side of the cap C and into the radiator so that by virtue of the perforations 22, the water in the radiator is admitted to the casing to act upon the float F. It will be understood that the position of the float in the casing is determined by the level of the water in the radiator so that as the water level varies, the position of the float will be varied accordingly. The position of the float is visibly indicated by means of the upper end of the stem T within the transparent tube 24, and by virtue of the arrangement of the latter it will be clear that the driver of a motor vehicle while in driving position can readily observe the position of the stem thereby determining the level of water within the radiator.

As previously described, the stem T is of tubular form and communicates interiorly with the float F, the purpose of this construction being to allow of the escape of vapor from the float. As a result of an experiment it has been found that a hollow metallic body, although tightly sealed when emersed in water, will not prevent the seepage of water through the pores of the metal, so that after continued use, a small quantity of water will accumulate within the body. As in the case of the float F, the smallest quantity of water within the float will obviously render the gauge inaccurate, and in order to insure of the gauge giving a proper indication of the water level within a radiator, the tubular stem has been provided. As the float F is immersed in hot water, the float is naturally heated so that the water which does find entrance into the float is vaporized, with the vapor passing exteriorly of the float through the stem T.

Although I have herein shown and described only one form of water gauge embodying my invention, it is to be understood that various changes and modifications may be made herein without departing from the spirit of the invention and the spirit and scope of the appended claim.

I claim as my invention:

A float indicator for radiators comprising a body adapted to be mounted upon the top of the radiator cap, said body having a comparatively thin center portion which is vertically slotted, there being a marginal bead formed on said body, ducts formed through the bead at the top and bottom thereof in alignment with said slotted portion, a transparent tube disposed in the slot and having its ends extending into said ducts, a removable plug closing the upper duct and the upper end of said tube, there being a threaded extension formed at the bottom of said body extending through the radiator cap, the bottom duct extending through said extension, a perforated protective casing mounted upon said extension upon the under side of the radiator cap, a hollow float freely movable within said casing, and a hollow stem mounted upon the float and communcating with the interior thereof, said stem and float being imperforate and the stem extending slidably into said tube.

In testimony whereof I have signed my name to this specification.

HENRY H. HAMMERSTROM.